July 8, 1952
F. W. MUTH
2,602,617
ADJUSTABLE FLAG HOLDER
Filed July 5, 1950
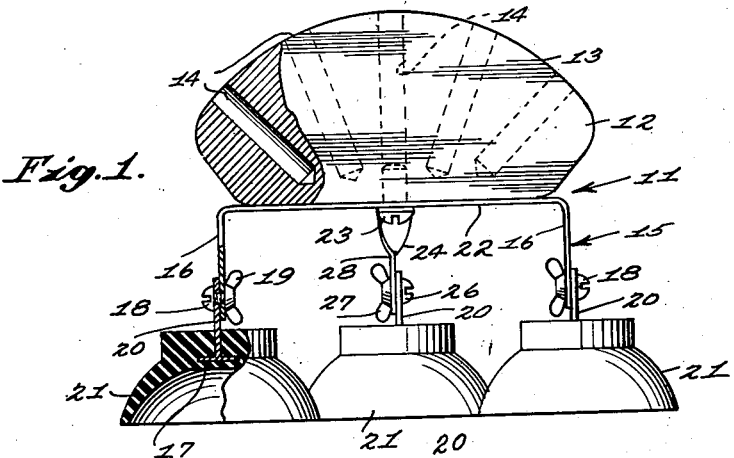
Fig. 1.
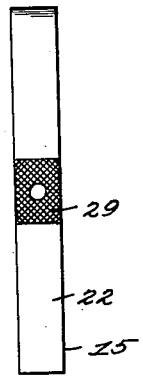
Fig. 4.
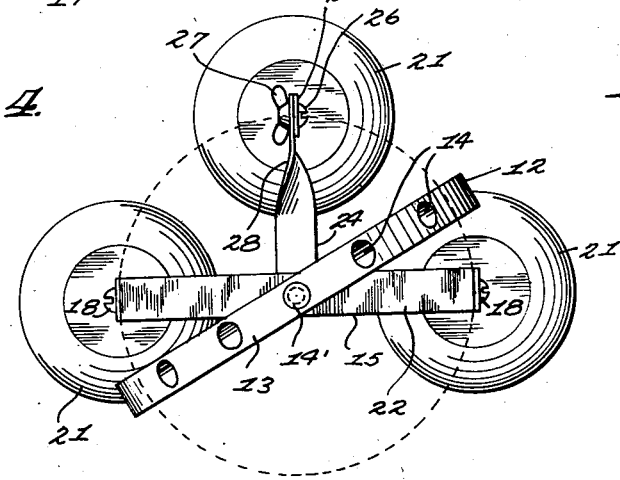
Fig. 2.
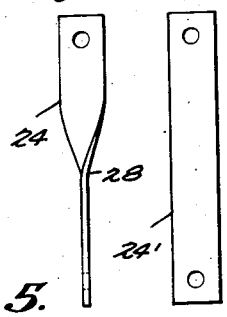
Fig. 6.
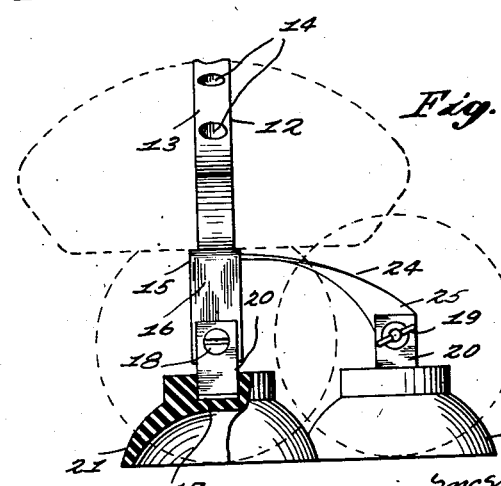
Fig. 3.
Fig. 5.
INVENTOR.
FRIEDRICK W. MUTH
BY
McMorrow, Berman + Davidson
ATTORNEYS Patented July 8, 1952

2,602,617

UNITED STATES PATENT OFFICE 2,602,617

ADJUSTABLE FLAG HOLDER

Friedrick W. Muth, Seattle, Wash.

Application July 5, 1950, Serial No. 172,123

1 Claim. (Cl. 248—39)

This invention relates to ornament holders, and more particularly to a flag holder for use on motor vehicles or the like.

A main object of the invention is to provide a novel and improved adjustable flag holder for use on automobiles or other motor vehicles, said flag holder being very simple in construction, involving only a few parts, and being readily adjustable to suit widely varying contours on various portions of motor vehicle bodies.

A further object of the invention is to provide an improved adjustable flag holder for use on motor vehicles, said flag holder being very inexpensive to manufacture, being sturdy in construction, being adapted to be secured to a portion of a motor vehicle body without the use of bolts or other similar fasteners, being adjustable to conform with contours of widely varying curvatures on different parts of an automobile or motor vehicle body, and being very easy to mount on a vehicle.

Further objects and advantages of the invention will become apparent from the following description and claim, and from the accompanying drawings, wherein:

Figure 1 is a front elevational view, partly in cross-section, of an improved flag holder for motor vehicles constructed in accordance with the present invention;

Figure 2 is a top plan view of the flag holder shown in Figure 1;

Figure 3 is a side elevational view, partly in cross-section, of the flag holder illustrated in Figures 1 and 2;

Figure 4 is a top plan detail view of the U-shaped bracket member employed in the flag holder of Figures 1 to 3;

Figure 5 is a detail plan view of one form of auxiliary leg member which may be employed with the flag holder of Figures 1 to 3;

Figure 6 is a detail plan view of another form of auxiliary leg member suitable for use with the flag holder of Figures 1 to 3.

Referring to the drawings, and more particularly to Figures 1 to 3, 11 generally designates the flag holder constructed according to the present invention, said flag holder comprising an upstanding plate member 12 of substantial thickness which may be made of any suitable material, such as plastic, wood or the like, said plate member having a curved top edge, shown at 13. The plate member 12 is formed with a plurality of bores 14 opening at the top edge 13 and extending in different directions, said bores being, for example, symmetrically inclined with respect to the vertical central bore, shown at 14'. Designated at 15 is an inverted bracket member having the depending vertical legs 16, 16. Pivotally secured to the lower ends of the vertical legs by means of bolts 18 and wing nuts 19 are inverted T-shaped bar members 20, the heads of the T-shaped members 20 being designated at 17, and said heads being embedded in rubber suction cups 21. The horizontal bight portion of the U-shaped bracket member 15 is designated at 22 and is pivotally secured at its mid-point to the mid-point of the bottom edge of the plate member 12 by a screw 23 which is threaded into the lower portion of the vertical bore 14' of the plate member 12. Pivotally secured to the mid-point of the bight portion 22 by the screw 23 is an auxiliary arm 24 which extends outwardly and has a depending offset portion 25. Pivotally secured to the free end of the offset depending portion 25 by a bolt 26 and wing nut 27 is an inverted T-bar 20 whose bottom end is embedded in a suction cup 21. In the embodiment of the invention shown in Figures 1 to 5, the arm 24 is twisted, as shown at 28, so that the inverted T-bar 20 pivotally secured thereto may be angularly adjusted around an axis parallel to the plane of the paper, as viewed in Figure 1, assuming that the arm 24 extends substantially at right angles to the plane of the U-shaped bracket 15. Alternatively, the arm may be made without the twist, as shown at 24' in Figure 6, whereby the inverted T-bar carried thereby may be adjusted around an axis perpendicular to the plane of the paper, as viewed in Figure 1.

In using the device, the suction cups 21 are engaged on the surface of a motor vehicle body where it is desired to mount the flag holder, the angular adjustments allowed by the screw 23, the bolts 18, 18 and the bolts 26 allowing the suction cups to be directed so as to engage the vehicle body surface with maximum attractive effect, even where the vehicle body has a relatively complex curvature. When the suction cups 21 have been firmly compressed into adhesive relation to the vehicle body, the wing nuts 19 and 27 may be tightened to rigidly secure the depending lugs 16, 16 and the auxiliary arms 24 or 24' to the upstanding stem portions 20 of the T-bar 17. Furthermore, angular adjustments of the auxiliary arm 24 or 24' may be readily made with respect to the bight portion 22 of the U-shaped bracket member 15 by loosening the screw 23. The plate member 13 may also be rotated to any desired angular position with respect to the bracket member 15 and secured in its adjusted position by tightening the screw 23. To facilitate the frictional locking of the plate member to the bight portion 22 of the bracket member 15, the top surface of the bight portion 15 is knurled around the aperture through which the screw member 23 passes, as shown at 29 in Figure 4.

It will be readily apparent that one or more flags may be mounted on the device by inserting the supporting posts of the flags in the respective bores 14 and 14'.

While a specific embodiment of an improved flag holder for motor vehicles has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A flag holder of the character described comprising an upstanding plate member formed with a plurality of bores opening at the top edge of said plate member, said bores extending in different directions and each being adapted to receive the post element of a flag, an inverted U-shaped bracket member pivotally secured to the bottom edge of said plate member, respective elastic suction cups secured to the ends of the depending legs of said bracket member, an offset depending arm pivotally secured to the top arm of said bracket member, and a further elastic suction cup pivotally secured to the end of said offset depending arm.

FRIEDRICK W. MUTH.

REFERENCES CITED

The following references are of record in the file of this patent:

UNITED STATES PATENTS

| Number | Name | Date |
|---|---|---|
| 1,039,554 | Lindhorst | Sept. 24, 1912 |
| 1,384,727 | Hutcheson | July 12, 1921 |
| 2,491,951 | Buettner et al. | Dec. 20, 1949 |

FOREIGN PATENTS

| Number | Country | Date |
|---|---|---|
| 14,205 | Great Britain | Oct. 19, 1887 |